United States Patent [19]

Schäffer

[11] Patent Number: 5,716,177
[45] Date of Patent: Feb. 10, 1998

[54] EXPANSIBLE PLUG FOR ANCHORING TO A BUILDING COMPONENT

[75] Inventor: March Schäffer, Horb-Mühlen, Germany

[73] Assignee: fischerwerke, Artur Fischer GmbH & Co. KG., Waldachtal, Germany

[21] Appl. No.: 714,464

[22] Filed: Sep. 16, 1996

[30] Foreign Application Priority Data

Sep. 15, 1995 [DE] Germany ............... 195 34 365.4

[51] Int. Cl.$^6$ .................................................. F16B 13/06
[52] U.S. Cl. ........................................... 411/60; 411/42
[58] Field of Search ............................. 411/15, 34, 35, 411/38, 39, 42, 44, 57–62, 55

[56] References Cited

U.S. PATENT DOCUMENTS

| | | | |
|---|---|---|---|
| 1,095,366 | 5/1914 | Abbott | 411/60 |
| 1,111,660 | 9/1914 | Malaby | 411/38 |
| 1,972,715 | 9/1934 | Pleister | 411/42 |
| 3,171,321 | 3/1965 | Fischer | 411/57 |
| 3,750,519 | 8/1973 | Lerich | 411/59 |
| 4,518,291 | 5/1985 | Lang | 411/60 |
| 4,720,224 | 1/1988 | Peterken | 411/57 |
| 5,230,595 | 7/1993 | Fischer | 411/60 |

FOREIGN PATENT DOCUMENTS

| | | |
|---|---|---|
| 0116599BI | 8/1983 | European Pat. Off. . |
| 05 25 50 230 | 5/1976 | Germany . |
| 3507022A1 | 8/1986 | Germany . |
| 338589 | 7/1959 | Switzerland . |
| 1475839 | 6/1977 | United Kingdom ............ 411/42 |
| WO 9204547A1 | 3/1992 | WIPO . |

*Primary Examiner*—Steven N. Meyers
*Assistant Examiner*—Gary Estremsky
*Attorney, Agent, or Firm*—Michael J. Striker

[57] ABSTRACT

An expansible plug for anchoring in a building component has a expansible sleeve having a front insertion-side end and provided with a plurality of slots which start from the front end and extend along a portion of a length of the expansible sleeve to form expansible legs, the expansible sleeve having a plurality of cut-outs which adjoin the slots and form a compressible zone, and a threaded bolt passing through the sleeve and having a front end provided with an expansion cone to be drawn into a portion of the expansible sleeve provided with the slots, the cut-outs being sickle-shaped and spaced from one another circumferentially and axially, the cut-outs having ends which point toward one another axially and overlap one another circumferentially in meandering formation to form bending webs.

7 Claims, 1 Drawing Sheet

EXPANSIBLE PLUG FOR ANCHORING TO A BUILDING COMPONENT

BACKGROUND OF THE INVENTION

The present invention relates to an expansible plug for anchoring in a building component, consisting of an expansible sleeve and a threaded bolt.

More particularly, it relates to such an expansible plug in which the expansible sleeve has a plurality of slots that start from its front, insertion-side end and extend along the portion of its length forming expansible legs and also a compressible zone, formed by cut-outs that adjoin the slots, and a threaded bolt passes through the sleeve and on the front end having an expansion cone to be drawn into the slotted portion of the expansible sleeve.

An expansible plug having an expansible sleeve that has a plurality of slots extending along a portion of its length is known from DE 35 07 022 A1. For anchoring the expansible plug, a threaded bolt that is provided with an expansion cone is drawing into the expansible sleeve by means of a nut that bears against the rear face of the expansible sleeve by way of a washer. Such an expansible plug is suitable for push-though mounting in which the expansible plug is pushed right through the article that is to be fastened and into the drilled hole that has been pre-drilled in the building component until the nut comes to rest against the outer surface of the article that is to be fastened. Since the nut bears both against the article to be fastened and against the rear end face of the expansible sleeve, sufficient anchoring of the expansible sleeve, but only insufficient clamping of the article to be fastened, can be obtained. As a result of the expansible sleeve becoming fixed in the anchoring process, an axial displacement of only the threaded bolt occurs but no axial displacement of the nut in the direction of the building component. As a result, no tightening forces can be brought to bear on the building component that is to be fastened. That is disadvantageous above all when, for example, there is a void in the region of the fastening point owing to unevenness in the surface of the building component and/or in the article that is to be fastened.

In order to avoid that disadvantage, in the known expansible plug a compressible zone is provided in the expansible sleeve, which zone directly adjoins the longitudinal slots. The compressible zone is formed by a plurality of oblique cut-outs that are arranged spaced one from another circumferentially. A similar compressible zone is known, also from WO 84/01005.

When the expansible plug has such a compressible zone, it is certainly possible to clamp the article that is to be fastened to the building component but a number of other disadvantages occur that considerably impair the ability of the known expansible plugs to function. As a result of the oblique cut-outs, on compression of the expansible sleeve, the rear portion of the expansible sleeve is displaced radially in relation to the front portion therefor and becomes jammed in the drilled hole and/or on the threaded bolt. Since the radial displacement is limited by the drilled hole and by the bolt, in addition the webs remaining between the cut-outs bulge uncontrollably both inwards and outwards. The results in further jamming of the threaded bolt with the expansible sleeve, which necessarily increases the resistance to being drawing in of the threaded bolt for expanding the plug. As a result of the non-uniform bulging-out and radial displacement between the upper and lower portion of the expansible sleeve, the expansion cone also is drawn non-uniformly into the expansible legs of the expansible sleeve that are formed as a result of the slots. As a result of the varying load of the expansible legs, the latter are expanded non-uniformly and some of them are so deformed by overloading that correct anchoring is not possible. The known expansible plugs are therefore not suitable for fastenings where safety is important.

SUMMARY OF THE INVENTION

Accordingly, it is an object of the present invention to provide an expansible plug which avoids the disadvantages of the prior art.

More particularly, it is an object of the present invention to provide an expansible plug having a compressible zone, which plug is simple to manufacture and enables operationally safe anchoring.

In keeping with these objects and with others which will become apparent hereinafter, one feature of the present invention resides, briefly stated, in an expansible plug, in which the compressible zone is formed by a plurality of sickle-shaped cut-outs that are arranged spaced one from another circumferentially and axially, and the ends of the cut-outs point toward one another axially and overlap one another circumferentially in meandering formation to form bending webs.

When the expansible plug is designed in accordance with the present invention, it avoids the disadvantages of the prior art and provide the above-mentioned advantages. As a result of the sickle-shaped cut-outs, which ends point towards one another and overlap one another circumferentially in meandering formation, a compressible zone is produced that enables an axial shortening of the expansible sleeve without radial displacement or bulges. In the compression process, the sickle-shaped cutouts are pressed together, the bending webs formed by the overlapping ends of the cut-outs being deformed exclusively in the axial direction and therefore without radial bulging. The cut-outs with their ends pointing towards one another and overlapping one another circumferentially permit an axial shortening of the expansible sleeve, without bulging, by twice the width of the cut-outs in the region of their apex. Since the expansible sleeve is shortened uniformly, the expansible legs of the expansible sleeve are also expanded uniformly radially. By virtue of the shortening of the expansible sleeve, clamping of the article that is to be fastened is possible even in the case of very serious voids.

In accordance with another feature of the present invention it is especially advantageous if the number of the cut-outs that form the compressible zone is twice the number of the longitudinal slots in the expansible sleeve and the apex of each of the sickle-shaped cut-outs that lie closest to the front end of the expansible sleeve is aligned with a respective longitudinal slot. Accordingly, a mushroom-shaped connection of the expansible legs to the expansible sleeve is obtained, which connection is exactly aligned with the expansible legs with the result that the shortening acts uniformly on all the expansible legs.

In accordance with still another feature of the present invention, the longitudinal slots can either extend to the cut-outs that lie closest to the front end of the expansible sleeve or alternatively can end at locations spaced from those cut-outs, in which case the end of the slot is preferably of enlarged form in order to facilitate opening-up of the expansible legs.

Finally, in accordance with a further feature of the present invention, especially advantages compression behavior is obtained if the width of the bending web between the overlapped ends of the cut-outs is approximately the inside width of the sickle-shaped cut-outs in the region of their apex and the width of the web remaining between the ends of the circumferentially arranged cut-outs is approximately twice the inside width of the sickle-shaped cut-outs in the region of their apex.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
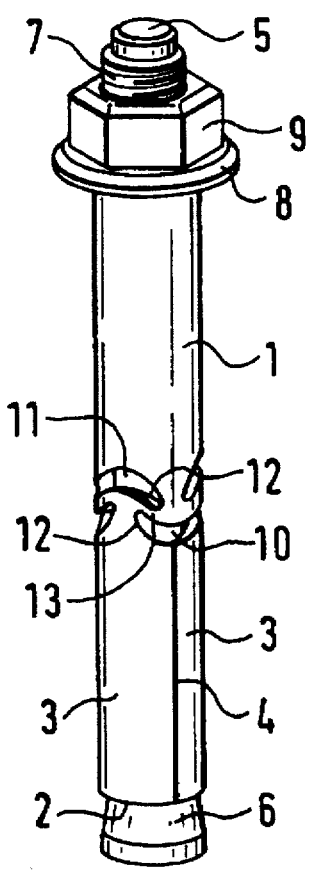
FIG. 1 shows an expansible plug according to the invention, having longitudinal slots that extend to a compressible zone.

The expansible plug according to the present invention as shown in FIG. 1 has an expansible sleeve 1 with longitudinal slots 4 starting from its front, insertion-side end 2 and forming a plurality of expansible legs 3. If the expansible sleeve is manufactured by being punched out of a sheet metal blank and subsequently rolled up, the one of the longitudinal slots is formed by the gap 4a resulting from rolling up (see FIG. 3). Inserted through the expansible sleeve 1 is a threaded bolt 5. On the front end of the threaded bolt 5 there is formed integrally an expansion cone 6. On the rear end of the threaded bolt is a threaded section 7, onto which a nut 9 that has a crimped-on washer 8 is screwed.

The expansible sleeve 1 has a plurality of sickle-shaped cut-outs 10, 11 that are arranged spaced one from another circumferentially and arranged spaced one from another circumferentially and axially and form a compressible zone. The ends 12 of the cut-outs 10, 11 point towards one another axially and overlap each other circumferentially in meandering formation so that bending webs 13 are produced between the ends. In the embodiment illustrated, the expansible sleeve has three longitudinal slots 4 and six cut-outs 10, 11 that form the compressible zone. The apex of each of the cut-outs 10 is aligned with a respective one of the longitudinal slots 4. Since the offset above-lying cut-outs 11 are therefore necessarily aligned with the expansible legs 3, a mushroom-shaped symmetrical connection of the expansible legs 3 to the expansible sleeve 1 is obtained. In the embodiment according to FIG. 1, the longitudinal slots 4 opens the cut-out 10 that lies closest to the front end 2 of the expansible sleeve 1.

Figure 2:
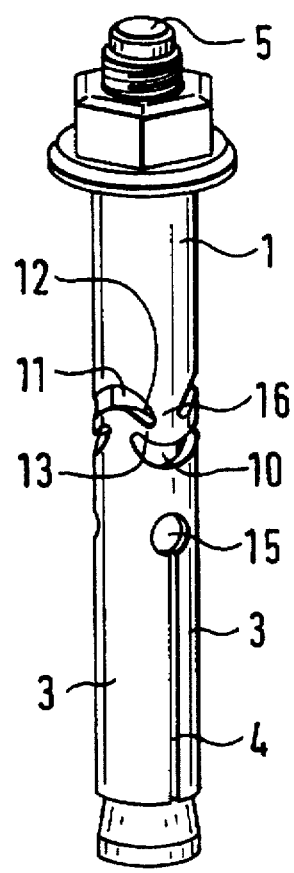
FIG. 2 shows the expansible plug having longitudinal slots extending to locations spaced from the compressible zone.

FIG. 2 illustrates another embodiment in which the longitudinal slots 4 end at locations spaced from the cut-outs 10, 11 that form the compressible zone. In order to facilitate opening-up of the expansible legs 3, the longitudinal slots 4 end in an enlargement 15. Sufficient ridigity of the expansible sleeve 1 combined with good compressibility is obtained by the fact that the width of the bending web 13 between the overlapped ends 12 of the cut-outs 10, 11 is approximately the inside width of the cut-outs 10, 11 in the region of their apex and the width of the web 16 remaining between the ends 12 of the circumferentially arranged cut-outs is approximately twice the inside width of the cut-outs 10, 11 in the region of their apex.

Figure 3:
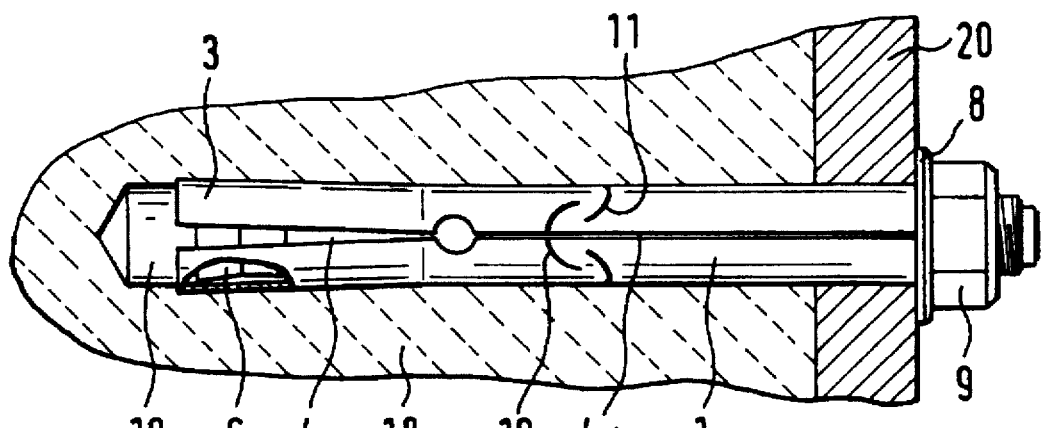
FIG. 3 shows the expansible plug according to FIG. 2 anchored in a building component.

FIG. 3 illustrates the expansible plug anchored in a building component 18. For anchoring the expansible plug the latter is pushed into the drilled hole 19 of the building component 18 until the nut 9 rests by its crimped-on washer 8 against the outer surface of the article 20 that is to be fastened. By drawing in the expansion cone 6 into the slotted region of the expansible sleeve 1, the expansible legs 3 are pressed radially outwards and thereby expanded and, at the same time, if there is a void between the building component 18 and the article 20 that is to be fastened the expansible sleeve 1 is compressed in the region of the compressible zone formed by the cut-outs 10, 11. Maximum compression is reached when the two bounding edges that form each cut-out rest on top of one another.

It will be understood that each of the elements described above, or two or more together, may also find a useful application in other types of constructions differing from the types described above.

While the invention has been illustrated and described as embodied in expansible plug for anchoring to a building component, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible plug for anchoring in a building component, comprising an expansible sleeve having a front insertion-side end and provided with a plurality of slots which start from said front end and extend along a portion of a length of said expansible sleeve to form expansible legs, said expansible sleeve having a plurality of cut-outs which adjoin said slots and form a compressible zone; a threaded bolt passing through said sleeve and having a front end provided with an expansion cone to be drawn into a portion of said expansible sleeve provided with said slots, where in an undeformed condition said cut-outs are sickle-shaped defining a concave side and are spaced from one another axially, having ends overlapping one another, said cut outs circumferentially, said cut-outs to form bending webs.

2. An expansible plug as defined in claim 1, wherein the total number of said cut-outs which form said compressible zone is twice the total number of said longitudinal slots in said expansible sleeve.

3. An expansible plug as defined in claim 1, wherein each of said cut-outs has an apex which is located closest to said front end of said expansible sleeve and is aligned with respect to one of said longitudinal slots.

4. An expansible sleeve as defined in claim 1, wherein said longitudinal slots extend to said cut-outs which lie closest to said front end of said expansible sleeve.

5. An expansible plug as defined in claim 1, wherein said longitudinal slots end at locations spaced from said cut-outs which lie closest to the said front end of said expansible sleeve.

6. An expansible plug as defined in claim 1, wherein a width of said bending web between said overlapping ends of said axially arranged cut-outs is approximately an inside width of said cut-outs.

7. An expansible plug as defined in claim 1, wherein a width of said web remaining between said ends of said circumferentially arranged cut-outs is approximately twice an inside width of said cut-outs in a region of an apex of said cut-outs.

* * * * *